United States Patent [19]
Balik

[11] Patent Number: 5,395,204
[45] Date of Patent: Mar. 7, 1995

[54] TRUCK TRAILER UNLOADING APPARATUS

[76] Inventor: Brent D. Balik, 30 E. Lane Ave. #106A, Columbus, Ohio 43201

[21] Appl. No.: 88,377

[22] Filed: Jul. 9, 1993

[51] Int. Cl.⁶ .............................................. B60P 1/38
[52] U.S. Cl. ........................... 414/517; 198/850; 198/697; 414/528; 414/529; 414/521
[58] Field of Search .............. 414/517, 518, 521, 528, 414/529, 525.1, 525.2; 198/721, 850, 699, 697

[56] References Cited

U.S. PATENT DOCUMENTS

| 313,777 | 3/1885 | Sells | 198/699 |
| 1,415,034 | 5/1922 | Moelscher | 414/528 X |
| 2,264,157 | 11/1941 | Baker et al. | 414/518 |
| 3,175,708 | 3/1965 | Felts | 414/517 |
| 3,333,715 | 8/1967 | Mepburn et al. | 414/521 X |
| 3,572,563 | 3/1971 | Oliver | 198/721 X |
| 3,998,343 | 12/1976 | Fors | 414/521 X |
| 4,306,830 | 12/1981 | le Duc | 414/529 X |

*Primary Examiner*—Frank E. Werner
*Assistant Examiner*—James Eller
*Attorney, Agent, or Firm*—E. Michael Combs

[57] ABSTRACT

A truck trailer includes a push plate extensible and retractable relative to a front wall of the trailer structure employing hydraulic ram structure to project the plate along the trailer floor, that in turn includes a row of rollers operative through a drive chain to simultaneously rotate the rollers to direct workpieces from the rollers employing the push plate to direct workpieces along the roller structure.

2 Claims, 4 Drawing Sheets

TRUCK TRAILER UNLOADING APPARATUS

BACKGROUND OF THE INVENTION

1. Field of the Invention

The field of invention relates to truck trailer apparatus, and more particularly pertains to a new and improved truck trailer unloading apparatus arranged to effect simultaneous and automatic loading of a cargo relative to the trailer structure.

2. Description of the Prior Art

Loading and unloading apparatus relative to vehicular equipment is indicated in the U.S. Pat. Nos. 4,077,534; 4,995,772; 4,925,356; and 4,892,456.

The instant invention attempts to overcome deficiencies of the prior art by providing for a compact structure readily retrofitted relative to trailer structure permitting the simultaneous cooperation of a push plate with trailer floor rollers.

SUMMARY OF THE INVENTION

In view of the foregoing disadvantages inherent in the known types of trailer unloading apparatus now present in the prior art, the present invention provides a truck trailer unloading apparatus employing a push plate reciprocatably mounted relative to a trailer front wall to project cargo from along the trailer floor formed by a row of simultaneously rotating rollers. As such, the general purpose of the present invention, which will be described subsequently in greater detail, is to provide a new and improved truck trailer unloading apparatus which has all the advantages of the prior art truck trailer unloading apparatus and none of the disadvantages.

To attain this, the present invention provides a truck trailer including a push plate extensible and retractable relative to a front wall of the trailer structure employing hydraulic ram structure to project the plate along the trailer floor, that in turn includes a row of rollers operative through a drive chain to simultaneously rotate the rollers to direct workpieces from the rollers employing the push plate to direct workpieces along the roller structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved truck trailer unloading apparatus which has all the advantages of the prior art truck trailer unloading apparatus and none of the disadvantages.

It is another object of the present invention to provide a new and improved truck trailer unloading apparatus which may be easily and efficiently manufactured and marketed.

It is a further object of the present invention to provide a new and improved truck trailer unloading apparatus which is of a durable and reliable construction.

An even further object of the present invention is to provide a new and improved truck trailer unloading apparatus which is susceptible of a low cost of manufacture with regard to both materials and labor, and which accordingly is then susceptible of low prices of sale to the consuming public, thereby making such truck trailer unloading apparatus economically available to the buying public.

Still yet another object of the present invention is to provide a new and improved truck trailer unloading apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
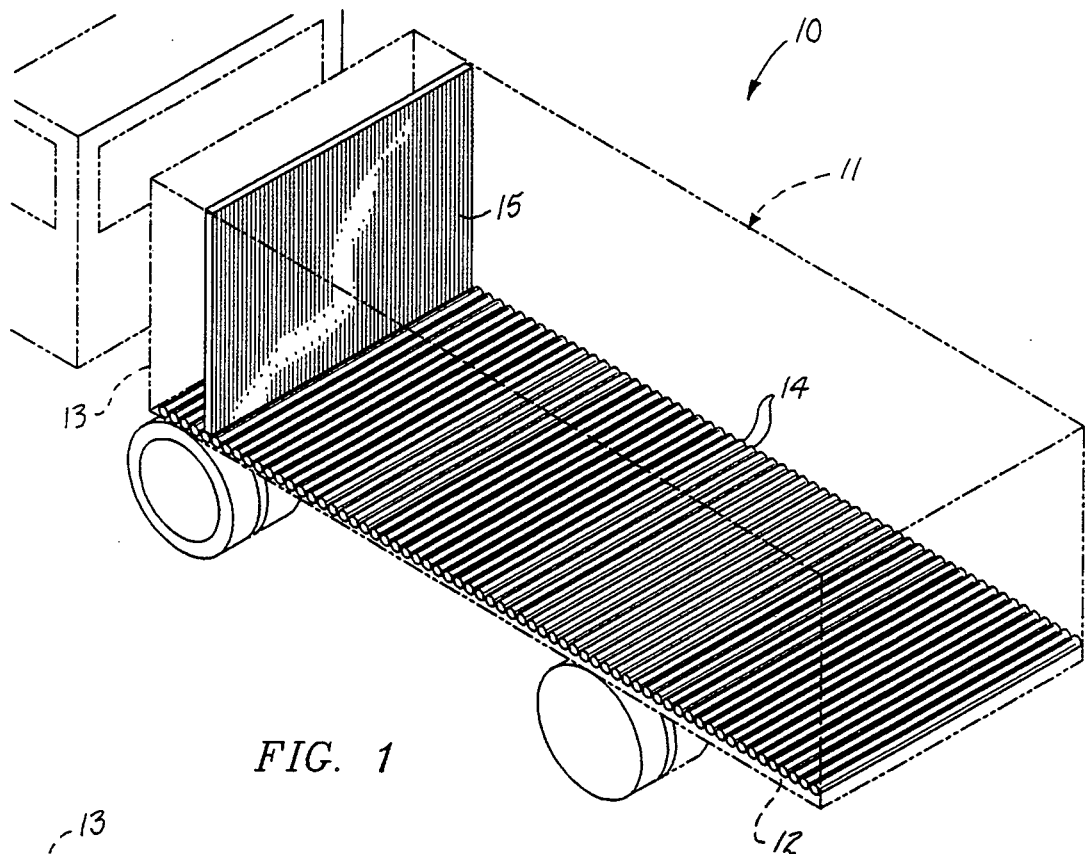
FIG. 1 is an isometric illustration of the invention.
Figure 2:
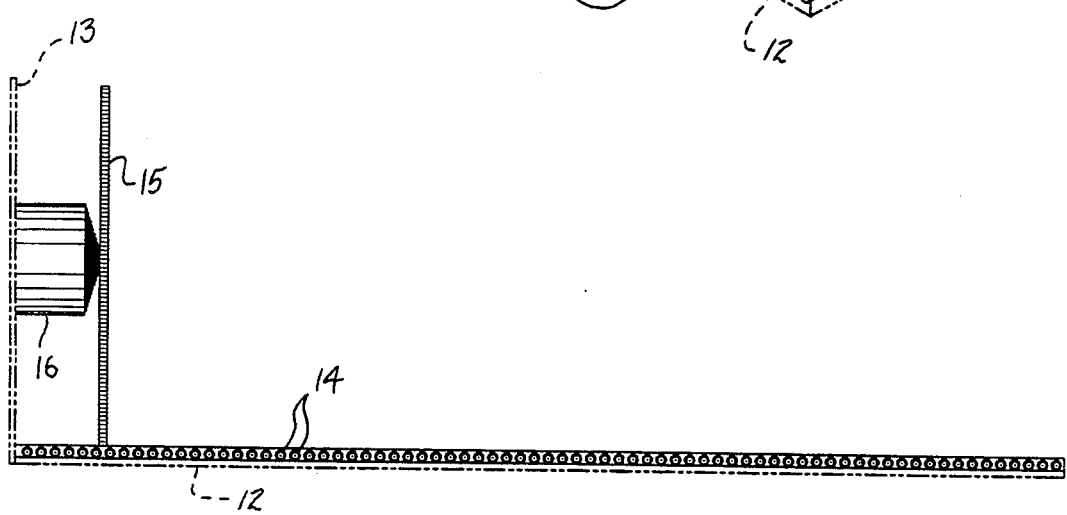
FIG. 2 is an orthographic side view of the invention.
Figure 3:
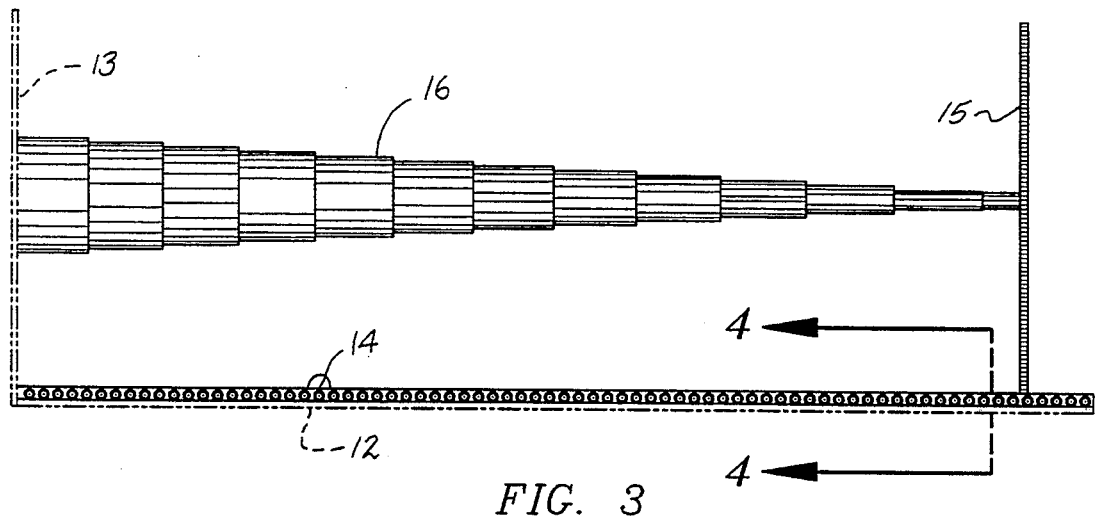
FIG. 3 is an orthographic view indicating the hydraulic ramp structure arranged in an extended orientation relative to the trailer floor.
Figure 4:
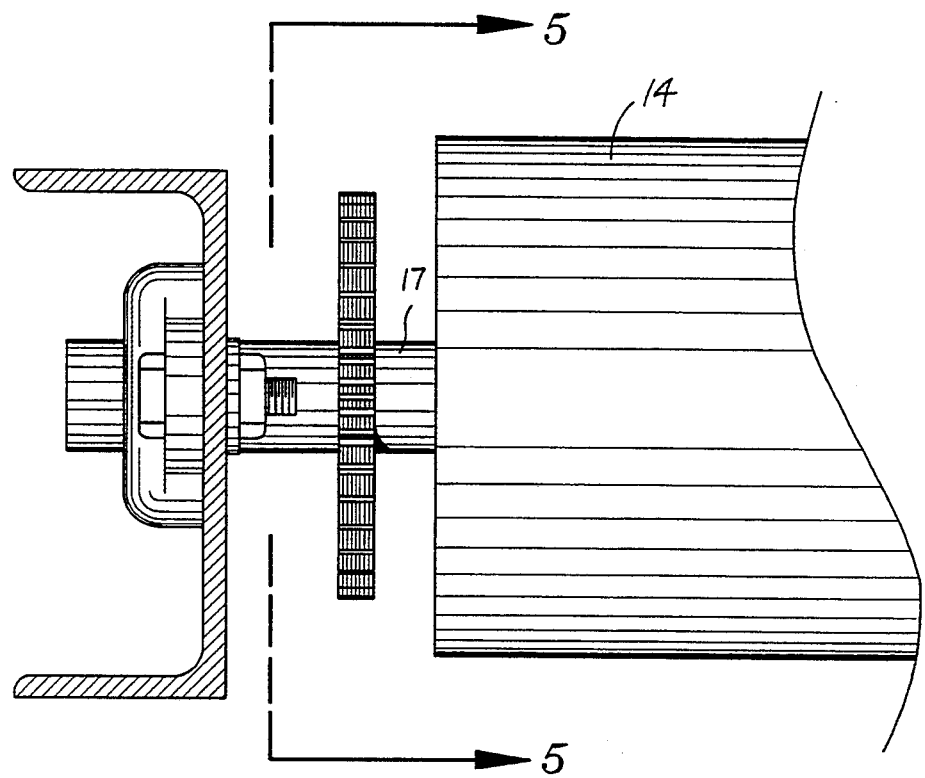
FIG. 4 is an orthographic view, taken along the lines 4—4 of FIG. 3 in the direction indicated by the arrows.
Figure 5:
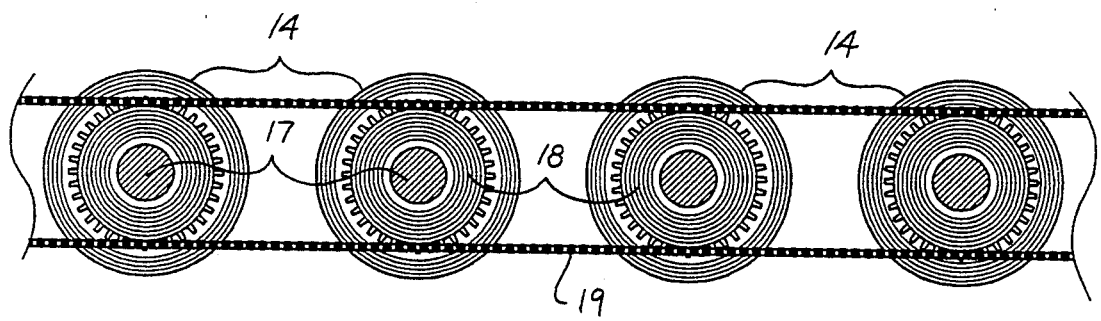
FIG. 5 is an orthographic view, taken along the lines 5—5 of FIG. 4 in the direction indicated by the arrows.

With reference now to the drawings, and in particular to FIGS. 1 to 8 thereof, a new and improved truck trailer unloading apparatus embodying the principles and concepts of the present invention and generally designated by the reference numeral 10 will be described.

More specifically, the truck trailer unloading apparatus 10 of the instant invention essentially comprises a trailer structure 11, having a floor 12 and a front wall 13. A row of rollers 14 are coextensively directed along the floor 12 arranged in a parallel relationship relative to one another and to the front wall 13. A push plate 15 is reciprocatably mounted relative to the front wall 13, with the push plate 15 arranged for projection coextensively along the row of rollers 14 by the employment of a telescoping hydraulic ram structure 16, as indicated in the FIGS. 2 and 3, to project cargo from along the row of rollers 14 functioning as a support surface of the cargo. Each of the rollers are fixedly secured about an axle 17, with each axle having a sprocket 18. The sprockets 18 are arranged in a coplanar alignment relative to one another, with a continuous drive chain 19 directed along the sprockets 18 to effect simultaneous rotation of the sprockets and the rollers 14 to assist in the directing of cargo therefrom. Any drive mechanism may be employed such as electric, hydraulic, and the like to effect rotation of the continuous drive chain 19.

Figure 6:
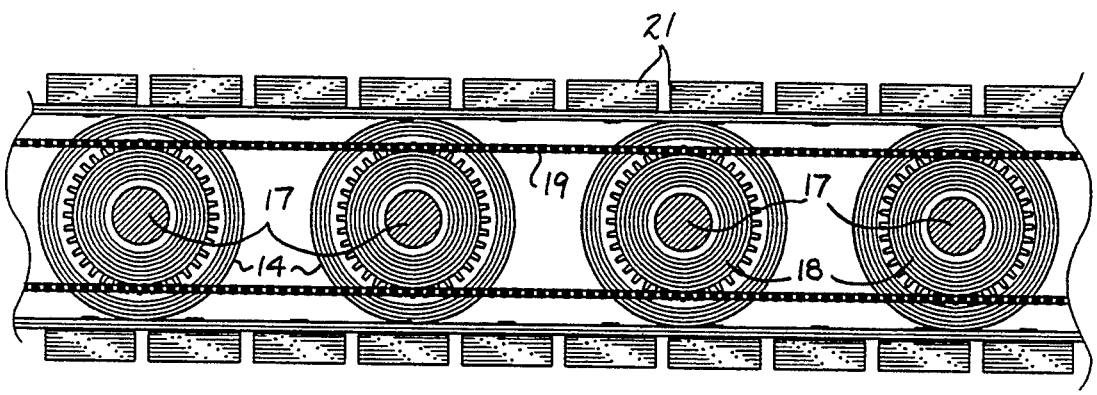
FIG. 6 is an orthographic view of the roller further employing positioning blocks arranged to enhance positioning of the push plate.
Figure 7:
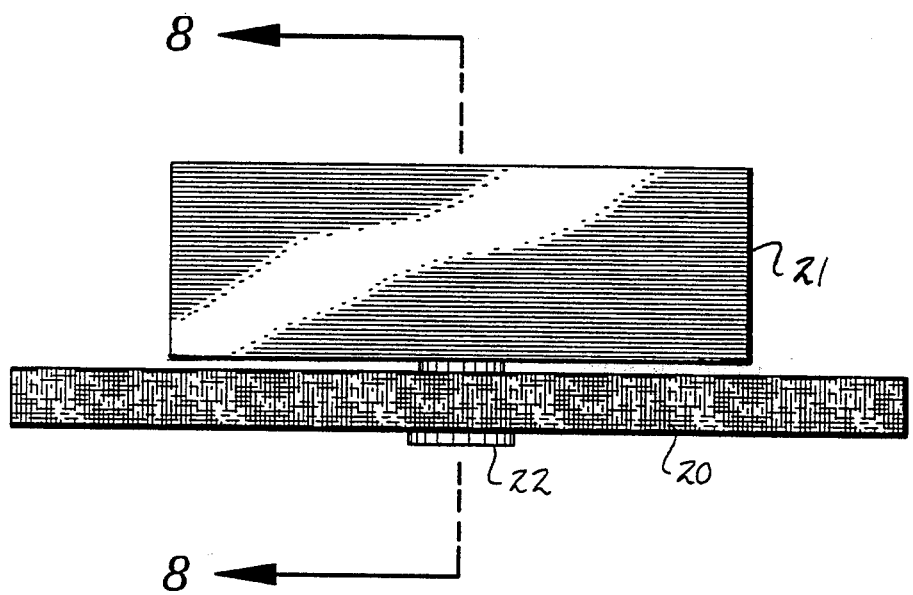
FIG. 7 is an enlarged orthographic top view of the positioning blocks.
Figure 8:
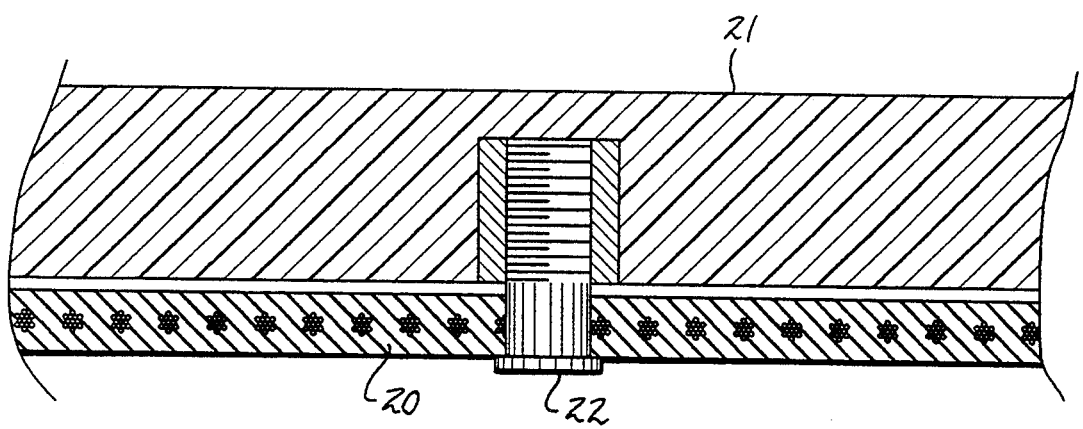
FIG. 8 is an orthographic view, taken along the lines 8—8 of FIG. 7 in the direction indicated by the arrows.

The FIGS. 6–8 indicates the use of a support belt 20 mounted coextensively about the rollers 14, having spaced positioning blocks 21 mounted thereon and spaced apart at predetermined intervals relative to one another equal to the predetermined spacing. In this manner, the push plate 15 is defined by a predetermined thickness substantially equal to the predetermined spacing, said push plate being positioned between two adjacent positioning blocks to provide for maintaining alignment of the push plate relative to the positioning blocks on the support belt 20 and to the row of rollers 14. Each of the positioning blocks 21 is mounted about a pivot axle 22 to the support belt 20 to accommodate various deflections of the positioning blocks 21 in the maintaining of the push plate 15 thereon. It should be understand that the push plate 15 is fixedly and orthogonally mounted to the hydraulic ram 16 to maintain securement of the push plate and its cooperation relative to the trailer 11, and more specifically to the trailer front wall 13.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A truck trailer unloading apparatus in combination with a truck trailer, having a trailer floor and a trailer front wall, with the apparatus comprising, a row of rollers coextensively mounted to the trailer floor, and a push plate reciprocatably mounted relative to the trailer front wall, with the push plate oriented coextensively with the trailer front wall, and ram means mounted between the trailer front wall and the push plate to effect reciprocation of the push plate along the row of rollers, and each roller of said row of rollers includes a roller axle fixedly mounted to said each roller, with each roller axle rotatably mounted relative to said trailer floor, and including a sprocket mounted about each roller axle, and a continuous drive chain mounted to each sprocket to effect simultaneous rotation of each of said rollers, and an endless support belt mounted about the row of rollers, with the support belt including positioning blocks spaced apart a predetermined spacing relative to one another continuously about the support belt, with the push plate having a thickness equal to a predetermined thickness substantially equal to said predetermined spacing, said push plate being positioned between two adjacent positioning blocks to maintain alignment of said push plate relative to the positioning blocks and to the row of rollers.

2. An apparatus as set forth in claim 1 wherein each of the positioning blocks includes a pivot axle mounted to said support belt to pivotally mount each of the positioning blocks to the support belt.

* * * * *